United States Patent [19]  [11]  3,933,700
Allen  [45] Jan. 20, 1976

[54] MODIFIED POLYURETHANE FOAMS CONTAINING IMIDE GROUPS

[75] Inventor: John K. Allen, Batavia, Ill.

[73] Assignee: Standard Oil Company, Chicago, Ill.

[22] Filed: Dec. 10, 1974

[21] Appl. No.: 531,234

Related U.S. Application Data

[63] Continuation-in-part of Ser. No. 340,354, March 12, 1973, which is a continuation-in-part of Ser. No. 119,876, March 1, 1971, abandoned, which is a continuation-in-part of Ser. No. 770,394, Oct. 24, 1968, abandoned.

[52] U.S. Cl..... 260/2.5 AT; 260/2.5 A; 260/2.5 AJ; 260/2.5 AV
[51] Int. Cl.² ........................................... C08J 9/06
[58] Field of Search..... 260/2.5 AN, 2.5 AV, 2.5 A, 260/2.5 AJ, 2.5 AT

[56] References Cited
UNITED STATES PATENTS

| | | | |
|---|---|---|---|
| 3,300,420 | 1/1967 | Frey | 260/2.5 |
| 3,317,480 | 5/1967 | Fetscher | 260/77.5 |
| 3,431,223 | 3/1969 | Reymore et al. | 260/2.5 |
| 3,562,189 | 2/1971 | Farrissey et al. | 260/2.5 |
| 3,622,525 | 11/1971 | Miller | 260/2.5 |

FOREIGN PATENTS OR APPLICATIONS

| | | | |
|---|---|---|---|
| 1,108,013 | 3/1968 | United Kingdom | 260/2.5 |
| 674,252 | 12/1965 | Belgium | |
| 6,516,709 | 6/1966 | Netherlands | |

*Primary Examiner*—Eugene C. Rzucidlo
*Attorney, Agent, or Firm*—James R. Henes; Arthur G. Gilkes; William T. McClain

[57] ABSTRACT

Fire resistant modified polyurethane foams are prepared from polyols and the monomeric products formed by the pre-reaction of polyarylpolyisocyanates and halogenated phthalic anhydrides at a temperature of about 210° to 300°C. wherein the weight ratio of the polyarylpolyisocyanate to be halogenated phthalic anhydride is from above 2:1 to 10:1 and wherein the amount of the imide incorporated into the polyarylpolyisocyanate varies from about 25 to about 75 percent.

4 Claims, No Drawings

MODIFIED POLYURETHANE FOAMS CONTAINING IMIDE GROUPS

This application is a continuation-in-part of Ser. No. 340,354 filed on Mar. 12, 1973 by the same inventor, which in turn is a continuation-in-part application of Ser. No. 119,876 filed on Mar. 1, 1971 by the same inventor and now abandoned, which in turn is a continuation-in-part application of Ser. No. 770,394 filed on Oct. 24, 1968 by the same inventor and now abandoned.

BACKGROUND OF THE INVENTION

This invention relates to flame-resistant, rigid foam compositions which are produced from foamable, modified polyurethane resins.

Rigid foams of the polyurethane type have a wide variety of industrial and commercial applications. For example, because of extreme buoyancy, rigid polyurethane foam is used as a flotation material in such items as boats, floating docks, surf boards and water closet ball floats. Because of the ability to assume shapes necessary to fill non-uniform voids, rigid foam finds application as a packaging material. In the aircraft industry, rigid foams are employed as structural reinforcement elements in wingtips, flaps, ailerons, and so forth. Such applications employ the foams as rigidizing agents which bond-in-place to metal or fiber glass skins to provide continuous skin support, thus eliminating rib-type construction.

The primary use of polyurethane-type rigid foams, however, is as an insulating material. As an insulator, rigid foam may be applied to walls, floors, roofs and the like as a preformed slab of varying thickness. It may be applied as a molded slab to such contour shapes as pipes and conduits, or it may be foamed in place to fill small openings and crevices, or to fill the air space between an outer and an inner construction surface. Polyurethane-type rigid foams possess many advantages as insulating materials. They provide the highest efficiency of any presently available insulation resulting in the lowest weight and volume for a given application. These foams possess excellent water, solvent and chemical resistance, are easily applied, can be mold formed and have good adhesive qualities.

Foamable polyurethane resin compositions may be described basically as the reaction products of polyisocyanates and polyhydric alcohols. Foam resin compositions are prepared from the components simply by mixing the polyol and the polyisocyanate. The addition of water or a low boiling fluorocarbon as a blowing agent is a common expedient to obtain better foaming action. Other components such as siloxane glycol surfactants which improve cell configuration, or catalysts such as tertiary amines, tin alkyls or the tin salts of organic acids, may be added to the reaction mixture prior to foaming. Addition of heat or pressure is necessary to achieve foaming for the so-called "hot foam" compositions, but "cold foam" compositions may be conveniently foamed at ambient temperature pressure.

Foam compositions prepared according to the manner described frequently do not provide the degree of fire retardance and self-extinguishment which is required of a particular insulating or building material. To achieve foams which have satisfactory properties of this nature, it is often necessary to add a flame retarding agent to the foam compositions. Such agents may be, for example, inert solids such as antimony trioxide or liquids such as halogenated organo-phosphorous derivatives. While the use of such fire retardants has, in general, advantageous effects on the fire-resistant properties of a foam composition, it is not a completely satisfactory method of increasing fire resistance. For example, such agents increase the storage and handling problems connected with foamed resin compositions. Another disadvantage of these agents is that they may result in a foam composition which has non-uniform fire-resistant properties because of uneven distribution of the agents throughout the foam. An additional disadvantage of some of the more sophisticated fire-retardant agents is, of course, cost.

Recently, however, various improvements have been discovered which modify polyurethane compositions by incorporating in the molecular structure of the foams additional components. These components, which frequently contain halogens tend to give foam of improved fire-resistance. One example of such improvements is disclosed in Belgian Pat. No. 674,252 in which trimellitic anhydride is chemically incorporated in the foam. Another example, disclosed in Ser. No. 723,593 filed Apr. 23, 1968 by S. H. Marcus, comprises certain novel adducts of polyhydric alcohols and polyfunctional carboxylic acid anhydrides which are used instead of a conventional polyol in foam formation.

I have now discovered that substituting the monomeric imide product of the pre-reaction of a polyarylpolyisocyanate and a polyfunctional carboxylic acid anhydride for the isocyanate component in a urethane-type foam produces foamed products having excellent fire-resistant properties. This monomeric imide product was disclosed and patented by me in U.S. Pat. No. 3,823,158. As can be seen in Table II all the foams containing the monomeric imide component had retained their weight in excess of 80 percent while the samples without the incorporation of the imide only 53 to 60 percent of the weight was retained. Foam compositions prepared according to my invention also give improvements over modified urethane foams such as those discussed above.

SUMMARY OF THE INVENTION

My invention concerns rigid fire-resistant foams which are prepared by reacting a polyol with the reaction product of a polyarylpolyisocyanate and the anhydride of a polyfunctional carboxylic acid. In addition, rigid foams prepared according to my invention may contain blowing agents, surfactants and other suitable agents or additives.

A particularly preferred embodiment of my invention comprises a rigid foam prepared from a polyol and the reaction product of a polyarylpolyisocyanate and a phthalic anhydride, especially tetrabromophthalic anhydride. These anhydrides when once reacted with an isocyanate group or a polyarylpolyisocyanate form monomers which are incapable of further reaction and thus extension of the system into polymeric form, unlike for example trimellitic anhydride. The consequences of this difference are critical. A polymeric product would be a higher molecular weight, larger, and more viscous material than would be the monomeric product of the reaction between a polyarylpolyisocyanate and a phthalic anhydride, under comparable reaction conditions.

This is illustrated in Table V. Comparison of the results of the experiments with Adduct Reference Numbers 129/A and 129/B which were made using tetrabromophthalic anhydride, with the results of the experiments with Adduct Reference Numbers 132/A, 134/A, and 135/A, which were made using trimellitic anhydride, shows that a much more viscous liquid product (or even a solid product) was produced when trimellitic anhydride was used, than when tetrabromophthalic anhydride was used. Comparison of the results for Adduct Reference Number 129/B with the results for Adduct Reference Numbers 132/A, 134/A, and 135/A proves that, even when the reaction temperatures are approximately the same, and even when the reaction is carried out for a much longer time with tetrabromophthalic anhydride than with trimellitic anhydride, use of trimellitic anhydride results in a much more viscous product than when tetrabromophthalic anhydride is used.

Thus, use of tetrabromophthalic anhydride, rather than trimellitic anhydride, is advantageous because the imide-containing polyarylpolyisocyanate derivatives produced from tetrabromophthalic anhydride have a lower viscosity than when trimellitic anhydride is used and because liquid products of medium viscosities are the most advantageous for use in rigid foam formulations.

DETAILED DESCRIPTION AND EXAMPLES

Polyols suitable for the preparation of foams according to my invention include generally any polyhydric alcohol having a hydroxyl functionality of at least three and a molecular weight below 2000. Polyols having a hydroxyl functionality less than three do not permit sufficient cross-linking to permit adequate foam strength. Polyols commonly utilized in my foam compositions are polyester and polyether polyols, but others such as amine and phorphorus-containing polyols may be employed.

Another class of polyols which are especially desirable for use in preparing foam compositions according to this invention are those described in Ser. No. 729,593 and U.S. Pat. No. 3,642,646, both filed Apr. 23, 1968. Polyols of this type may be described as half ester reaction adducts of polyether polyols or mixtures of polyether polyols and anhydrides of polyfunctional carboxylic acids. The adduct polyols may additionally contain poly(ethylene-glycols) which serve as both diluents and additional sources of hydroxyl groups.

The monomeric isocyanate-derived compounds with which a polyol is reacted to produce foams according to this invention are described in Ser. No. 770,383 filed Oct. 24, 1968, and now abandoned. These compounds may generally be described as the monomeric products of the pre-reaction of polyarylpolyisocyanates and polyfunctional carboxylic acid anhydrides. Generally a polyarylpolyisocyanate having two or more isocyanato groups per molecule may be reacted with the anhydride of a carboxylic acid having at least two carboxyl groups. The reaction is at atmospheric pressure and at a temperature of between about 210°–300°C. Time of the reaction depends on the product viscosity desired.

Polyarylpolyisocyanates suitable for the preparation of these isocyanate derivatives contain at least two aromatic rings, each ring being substituted by at least one isocyanato group. The aromatic rings may be suitably interconnected by one or more methylene, propylene, carbonyl, sulfoxide, sulfone or ether linkages. Isocyanate-substituted biphenyls are also suitable. The aromatic rings of any of the above compounds may be additionally substituted by ethyl, methyl or propyl groups. Specific examples of suitable polyarylpolyisocyanates for use with the invention include: polymethylene polyphenylisocyanates having from 2 to 10 benzene rings and liquid mixtures at room temperature of polymethylene polyphenylisocyanate with one or more of the following polyarylpolyisocyanates; 4,4'-diphenylmethylene diisocyanate; diphenylmethylene 3,3'-diisocyanate; diphenyl diisocyanate; diphenylsulfone diisocyanate, diphenylsulfide diisocyanate; diphenysulfoxide diisocyanate; and diphenylpropane diisocyanate. Polymethylene polyphenylisocyanates having an average benzene ring content of about 2.1 to 3.5 per molecule are particularly suitable isocyanates.

Anhydrides suitable for reacting with the described isocyanates may be generally described as anhydrides of carboxylic acids containing two or more carboxy functions. The carboxylic acids are aromatic and may contain substituents such as alkyl or halogen in addition to the carboxy functions. Suitable anhydrides include: phthalic anhydride, tetrachlorophthalic anhydride and tetrabromophthalic anhydride. Halogen containing anhydrides are generally preferred and tetrabromophthalic anhydride is especially preferred.

The monomeric imide isocyanate-anhydride reaction products are prepared by combining the two components in a stirred vessel in the presence of added heat until reaction occurs. It is advantageous to employ $N_2$ blanketing although the reaction may be conducted in open atmosphere. Ordinarily the reaction proceeds satisfactorily without a catalyst.

Reaction temperature may vary suitably between about 210°–300°C. Preferred temperatures vary with the particular reactants but tend generally to be in the range of 210°–220°C. As shown in Table V at reaction temperatures below 210°C. particularly in range 100°–120°C. no imides are formed.

The principal reaction leading to the formation of the imide-containing isocyanate derivatives is assumed to proceed according to the reaction scheme below where phthalic anhydride is employed as an example of a suitable anhydride, and 4-isocyanato-bis-diphenylmethane is employed as an example of a suitable isocyanate:

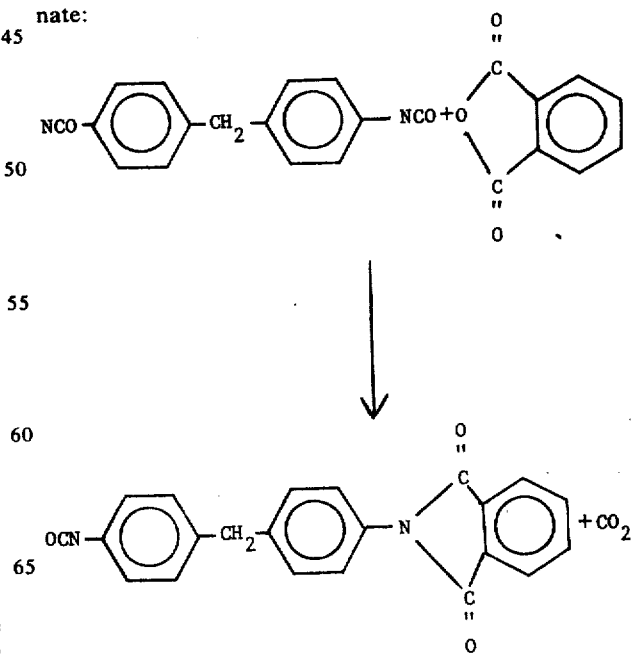

In addition to this principal reaction side reactions also occur, so that it is difficult accurately to identify all compounds present in the reaction product.

Product viscosity increases with increasing extent of reaction, and by continuing the reaction for a sufficient length of time a solid product may be obtained. In a given instance the reaction is conducted for a length of time suitable to achieve a product having the viscosity desired.

Viscosities of the products may also be controlled by the ratios of reactants employed. In general this ratio is not critical except that a mole excess of isocyanate is preferred to insure complete utilization of the anhydride.

For liquid products of medium viscosities which are the most advantageous for use in rigid foam formulations, it is frequently preferred to react above about 2 weight parts of the isocyanate with 1 weight part of the anhydride and subsequently to dilute the product to the desired viscosity with additional isocyanate. The two-step procedure produces a product having a lower viscosity than a one-step product having the same final weight ratio of isocyanate to anhydride.

The rigid foam composition comprises the reaction product of one equivalent based on hydroxyl of a polyol having an average hydroxyl functionality of at least 3 and from about 0.5 to about 12 equivalents, based on the isocyanate, of a polyarylpolyisocyanate, the improvement in said foam comprising the incorporating into the foam composition through the polyarylpolyisocyanate a monomeric imide prepared by pre-reacting a mixture comprising a polyarylpolyisocyanate characterized by a structure having 2:1 to 10:1 benzene or methyl, ethyl or propyl substituted benzene rings linked by alkylene groups of from one to three carbon atoms, said benzene rings having one isocyanate functionality group per ring, and phthalic acid anhydride or the completely halogenated derivative thereof, at a temperature between 210°C. and 300°C. in a weight ratio of said polyarylpolyisocyanate to said anhydride of from above 2 to 10 wherein the amount of imide incorporated into the polyarylpolyisocyanate, calculated on the basis of the original anhydride groups converted to imide groups, varies from about 25 to 75 percent, preferably from about 35 to 65 percent, until a liquid product of the desired viscosity is obtained.

Preparation of foams of the type disclosed by my invention is according to techniques known to the art. Various methods of producing these foam compositions are practicable. In the so-called "one-shot" method, the polyol and polyisocyanate components together with any catalyst or blowing agents are combined simultaneously to produce the foam. According to the prepolymer method, the polyol and the polyisocyanate components are combined in a dry vessel and allowed to react to a limited extent to form a prepolymer. When it is desired to complete the foam formation, water is added to the prepolymer and the reaction is allowed to go to completion. Other methods of foam formation, such as the quasi-prepolymer method, will be familiar to those skilled in the art.

To achieve satisfactory foamed products it is advantageous to employ from about 0.5 to about 12 equivalents of the polyisocyanate derivative (based on isocyanato) for each equivalent of polyol (based on hydroxyl functionality). More usually the polyisocyanate derivative will be employed in an amount equal to from about 1.0 to about 1.5 equivalents for each equivalent of polyol. A particularly preferred composition is from about 1.1 to about 1.2 equivalents of isocyanate derivative for each equivalent of polyol.

In order to get a rapid foaming reaction, it may be convenient to use a catalyst. Many catalyst types are known but they may be generally characterized as organometallics, tertiary amines, or metal salts of organic acids. Tertiary amines and organo-tin compounds, especially as tin salts, are particularly effective. Suitable amines include triethylamines, diethylamines and diethylcyclohexylamines. Organo-tin compounds are also suitable catalysts. Organic substituents on the central tin molecule can be aliphatic compounds having from 1 to 6 carbon atoms, benzene or benzene derivatives, or heterocyclic compounds. Dibutyl tin dilaurate, stannous octanate, and dibutyl tin diacetate are particularly advantageous organo-tin catalysts. Catalysts for foam formation are usually present in amounts equal to from about 0.05 to about 2.0 weight percent of the starting mixture.

Any method that will lead to the formation of a gas within the reaction mixture will produce foamed products. In order to get very good foams, it is helpful to use a blowing agent. One such blowing agent is, for example, water which, when added to the reaction mixture, causes the liberation of carbon dioxide. Another class of useful external blowing agents is the group of fluorine-containing lower alkanes boiling above 20°C. The amount of blowing agent combined with the reactant mixture can vary from about 1 to about 20 weight percent. An advantageous amount of blowing agent, especially for a fluorine containing blowing agent, is about 12 weight percent.

In addition to the basic components necessary to foam formation, it is often advantageous to employ additive materials which provide a selective advantage to the foam composition. One such additive is a silicone surfactant. Silicones of the type useful in rigid foam preparation are surface tension depressants. As such, they reduce the energy required to form new surfaces and thus promote bubble formation. Highly effective agents also favor the production of more uniform bubbles and resulting cell structure. The silicones also equalize tensions on the surface of the bubble resulting in a foam of increased strength. The amount of surfactant present can vary from 0.01 to about 2.0 weight percent of the foam component mixture.

Foam compositions of this invention were tested according to a method devised by Butler Manufacturing Company which is known as the Chimney Test. The apparatus for this test consists of a chimney constructed on three sides of galvanized steel. Dimensions are 2¼ × 2¼ × 12 inches. Channels are provided for sliding in ¼ inch wired safety glass as the front panel of the chimney. Foam samples are mounted on three nails protruding from the back panel. Samples are cut to ¾ × ¾ × 5 inches and mounted so that the bottom of the sample is 2 inches from the bottom of the chimney.

The flame source is a Bunsen burner fitted with a needle valve and adjustable air intake. Natural gas is metered on a Brooke R-2-15-AA rotameter. Flow is adjusted with the needle valve to a rotameter reading of 11.0 (bottom of the stainless steel ball). Flame temperature is measured using a chromel-alumel thermocouple connected into a West Gardsman JE controlling pyrometer. Air flow is adjusted to a flame temperature reading on the pyrometer of 1660° ± 10°F., with the thermocouple set at the tip of the inner cone and the burner in position in the chimney.

With the weighed sample centered in the chimney, the tip of the inner cone is held in contact with the bottom of the sample for 10 seconds and then removed. Results of the Chimney Test were reported as three kinds of data:

1. Percent weight retention (PWR) which is the weight of the sample after the test compared to the sample weight before the test;
2. Extinction time in seconds (EXT) measured as the length of time from contact of the flame with the sample to flame extinction;
3. Flame height (FHt) rated visually from A–D.

The tests were performed in a laboratory having a relative humidity of 40 ± 2 percent.

In order to illustrate more completely the compositions of my invention and the methods of their preparation, the following representative examples are offered. These examples are not and are not intended to be exhaustive of the scope of my invention.

| Isocyanate | Functionality | Equivalent Weight |
|---|---|---|
| Mondur MR | 2.5–2.7 | 132 |
| PAPI | 3.0 | 133.5 |
| Isonate 390P | 2.2–2.3 | 130 |
| NCO-120 | 3.1–3.2 | 133 |
| 7418 | 3.3–3.4 | 140 |
| Isonate-500 | 3 | 140.8 |
| Isonate-125MF | 2 | 125 |
| NCO-10 | 2.3 | 133 |
| NCO-20 | 2.6 | 133 |

The polyfunctional carboxylic acid anhydrides employed are identified by the following symbols:

| Symbol | Anhydride Name |
|---|---|
| Br$_4$PAN | tetrabromophthalic anhydride |
| Cl$_4$PAN | tetrachlorophthalic anhydride |
| PAN | phthalic anhydride |
| TMA | trimellitic anhydride |
| ClAN | chlorendic anhydride |

TABLE I

| Derivative Number | Isocyanate Type | Anhydride Type | Isocyanate Anhydride weight ratio | Heat-up time (min.) to 500°F. | Time (min.) held at 500°F. | Derivative Viscosity (c.p. 70–75°F.) |
|---|---|---|---|---|---|---|
| 12 | MR | Br$_4$PAN | 2/1 | 18 | 0 | very viscous |
| 20 | MR | Br$_4$PAN | 5/1 | 17.6 | 0 | 121,000 |
| 26 | PAPI | Br$_4$PAN | 5/1 | 16.3 | 0 | very viscous |
| 27 | 390P | Br$_4$PAN | 5/1 | 15.6 | 0 | some solid separated |
| 28 | NCO-120 | Br$_4$PAN | 5/1 | 17.8 | 0 | very viscous |
| 29 | 7418 | Br$_4$PAN | 5/1 | 17.0 | 0 | 980,000 |
| 30 | 500 | Br$_4$PAN | 5/1 | 14.0 | 0 | very viscous |
| 31 | 125MF | Br$_4$PAN | 5/1 | 20.5 | 0 | some solid separated |
| 25 | MR | PAN | 20/1 | 16.5 | 0 | 650 |
| 55 | 390P | Cl$_4$PAN | 2/1 | 14.7 | 15 | solid |
| 58 | 390P | Cl$_4$PAN | 5/1 | 19.0 | 15 | solid |
| 59 | 390P | Cl$_4$PAN | 5/1 | — | 30 | 950 |
| 48 | 390P | Br$_4$PAN | 4/1 | 16.5 | 5 | 48,500 |
| 37 | 125MF | Br$_4$PAN | 5/1 | 20.4 | 15 | 400 |
| H-8 | NCO-10 | ClAN | 2/1 | + | 1 hr* | solid precipitated |
| H-10 | NCO-10 | ClAN | 2/1 | ++ | 2 hr* | 18,900 |
| RW47 | NCO-10 | ClAN | 5/1 | +++ | 4 hr** | 780 |

\* At 410°F.; reaction in 1 liter flask
\*\* At 392°F.; reaction in 1 liter flask
+ Heat-up time to 410°F. was 38 min.
++ Heat-up time to 410°F. was 35 min.
+++ Heat-up time to 392°F. was 30 min.

EXAMPLE I

Isocyanate derivatives suitable for use in my invention were prepared from a variety of polyaryl-polyisocyanates and polyfunctional carboxylic acid anhydrides. Reaction conditions and adduct formulations are shown in Table I.

The derivatives were prepared in a 2 liter stainless steel beaker fitted with an aluminum foil cover. In each preparation the reactants were stirred and heated to 550°F., held at 500°F. for the length of time shown and cooled to room temperature.

The isocyanates employed are all polymethylene polyphenylisocyanates having the following functionalities (functional groups per molecule) and equivalent weights:

EXAMPLE II

Foam compositions were prepared according to my invention having the formulations given in Table II. Results of Chimney Test evaluation are included. It is evident from this data that the isocyanate derivatives containing tetrabromophthalic anhydride impart especially effective fire resistance to the foams which contain them.

Symbols used in Table II are defined in Table III. Isocyanate derivatives are identified in Table IV. In each case in Table II, the surfactant L-5410 was used at the level of 2 parts by weight. In each case in Table II, the catalyst DBTDA was used. The catalyst was used at the level of 0.5 parts by weight in foam number 1075/177/A61 and at the level of 1 part by weight in all other foams.

TABLE II

| Foam Number | Chemical Types | | | Formulation (parts by Weight) | | | | | Evaluation | | |
|---|---|---|---|---|---|---|---|---|---|---|---|
| | Isocyanate Derivative | Polyol | Additive | Isocyanate Derivative | Polyol | TMA | CFCl$_3$ | Additive | PWR | EXT | FHt |
| 1075/153/A14 | 14 | S5-125 | C-22-R | 127 | 100 | — | 24 | 15 | 83 | 11 | B |
| 1075/161/A27 | 20 | PEP-450 | C-22-R | 236 | 100 | — | 32 | 15 | 75 | 14 | D |
| 1075/177/A61 | 47 | PEP-450 | C-22-R | 260 | 100 | — | 30 | 15 | 79 | 11 | C |
| 1075/179/A68 | 46 | S5-125 | — | 192 | 100 | — | 30 | 0 | 88 | 11 | B |

TABLE II-continued

| Foam Number | Chemical Types | | | Formulation (parts by Weight) | | | | | Evaluation | | |
|---|---|---|---|---|---|---|---|---|---|---|---|
| | Isocyanate Derivative | Polyol | Additive | Isocyanate Derivative | Polyol | TMA | CFCl$_3$ | Additive | PWR | EXT | FHt |
| 1075/174/A51 | 32 | S5-125 | C-22-R | 154 | 100 | — | 20 | 15 | 90 | 11 | B |
| 1075/189/A98 | 59 | S5-125 | — | 154 | 100 | — | 30 | 0 | 77 | 12 | D |
| 1075/174/A56 | 45 | S5-125 | — | 154 | 100 | —20 | 0 | 80 | 11 | C | |
| 1075/185/A84 | 51 | S5-125 | — | 154 | 100 | — | 30 | 0 | 80 | 11 | C |
| 1075/185/A89 | 53 | S5-125 | C-22-R | 160 | 100 | — | 30 | 15 | 88 | 11 | B |
| 1075/187/A91 | 51 | S5-125 | C-22-R | 120 | 66 | 55 | 40 | 15 | 90 | 11 | B |
| 1075/187/A94 | 53 | S5-125 | — | 120 | 66 | 55 | 40 | 0 | 90 | 11 | B-A |
| 1075/198/A137 | C-195 | PEP-450 | C-22-R | 120 | 40 | 55 | 40 | 15 | 83 | 11 | B |
| 1075/202/A171 | C-195 | ( S5-125 ( PEP-450 | — | 120 | (40 (40 | 55 | 40 | 0 | 81 | 11 | D |
| 1075/161/A18 | MONDUR* MR | PEP-450 | — | 197 | 100 | — | 32 | 0 | 53 | 29 | D |
| 1075/161/A19 | MONDUR* MR | PEP-450 | C-22-R | 197 | 100 | — | 32 | 15 | 60 | 15 | D |

*No anhydride added

TABLE III

| SYMBOL | SYMBOL DEFINITIONS DEFINITION |
|---|---|
| DBTDA | Dibutyltin Diacetate |
| L-5410 DC-195 | Siloxane glycol block copolymer surfactants |
| C-22-R | ClCH$_2$CH$_2$—O—$\overset{O}{\underset{\|}{P}}$—O—CH—$\overset{O}{\underset{\|}{P}}$—O—$\overset{CH_3}{\underset{\|}{CH}}$—$\overset{O}{\underset{\|}{P}}$(OCH$_2$CH$_2$Cl)$_2$<br>　　　　　$\|$　　　　　$\|$　　　$\|$<br>　　　ClCH$_2$—CH$_2$　　CH$_3$　OCH$_2$CH$_2$Cl |
| MR (Mondur MR) 390P 7418 NCO 10 NCO 20 TMA Br$_4$PAN Cl$_4$PAN PAN ClAN | See Example I |
| PEP 450 | A propoxylated pentaerythritol polyol manufactured by Wyandotte and having an equivalent weight of 100, a functionality of 4 and a hydroxyl number of 561. |
| S5-125 | A polyol prepared by reacting 1.8 parts of RS-530, a propoxylated sucrose manufactured by Dow, having an equivalent weight of 106, a functionality of 8 and an hydroxyl number of 530, with 4.2 parts of a poly(ethylene-glycol) having an average molecular weight of about 200, 3.0 parts of tetrabromophthalic anhydride and 0.03 parts of triethyl amine. The reaction mixture is held at 180°F. for 20 hours under N$_2$ pressure of 10 psig. |

TABLE IV

ISOCYANATE DERIVATIVE FORMULATIONS

The isocyanate derivatives listed below were prepared by combining amounts corresponding to the initial weight ratio of isocyanates and anhydride. The reactants were heated to 500°F. under N$_2$ blanket and cooled. Some of the reactions were maintained at 500°F. for several minutes as indicated in the right-hand column of Table IV.

| Code Number | Isocyanate Identification | Anhydride Identification | Initial Isocyanate/ Anhydride weight ratio | Diluent | Final wt. ratio of isocyanate/anhydride in product | Minutes at 500°F |
|---|---|---|---|---|---|---|
| 14 | MR | Br$_4$PAN | 4/1 | — | 4/1 | 0 |
| 20 | MR | Br$_4$PAN | 5/1 | — | 5/1 | 0 |
| 25 | MR | PAN | 20/1 | — | 20/1 | 0 |
| 47 | 390P | Br$_4$PAN | 3/1 | — | 3/1 | 5 |
| 59 | 390P | Cl$_4$PAN | 5/1 | — | 5/1 | 30 |
| 46 | 390P | Br$_4$PAN | 2/1 | — | 2/1 | 5 |
| 32 | 390P | Br$_4$PAN | 5/1 | — | 5/1 | 5 |
| 45 | 125MF | Br$_4$PAN | 4/1 | — | 4/1 | 30 |
| 51 | 390P | Br$_4$PAN | 2/1 | 390P | 5/1 | 5 |
| 53 | 390P | Br$_4$PAN | 2/1 | 7418 | 5/1 | 5 |
| C-195 | 390P | Br$_4$PAN | 2/1 | 390P | 5/1 | 5 |
| RW-38 | NCO-20 | ClAN | 3/1 | — | 3/1 | * |
| RW-47 | NCO-10 | ClAN | 5/1 | — | 5/1 | * |

*At 392°F, 4 hrs.

TABLE V

| Adduct Reference Number | Chemical Components* | | Final Isocyanate/Anhydride/Weight Ratio | Preparation Conditions | | Adduct Viscosity | | |
|---|---|---|---|---|---|---|---|---|
| | Anhydride Type | Weight (g) | | Temperature (°C.) | Time Hrs. | Temperature (°F.) | Value (c.p.) | |
| 129/A | Br$_4$PAN | 750 | 5/1 | 210 | 6 | 74 | 5,800 | Considerable reaction to give cyclic imide |
| 129/B | Br$_4$PAN | 750 | 5/1 | 120 | 24 | 72 | 548** | Solid Portion: Mainly unreacted tetrabromo- |

TABLE V-continued

| Adduct Reference Number | Chemical Components* | | | Preparation Conditions | | Adduct Viscosity | | |
|---|---|---|---|---|---|---|---|---|
| | Anhydride | | Final Isocyanate/Anhydride/Weight Ratio | Temperature (°C.) | Time Hrs. | Temperature (°F.) | Value (c.p.) | |
| | Type | Weight (g) | | | | | | |
| | | | | | | | | phthalic anhydride Liquid Portion: Mainly unreacted isocyanate |
| 132/A | TMA | 750 | 5/1 | 100 | 0.25 | 74 | Solid Product | Very little, if any, amide or imide formation |
| 134/A | TMA | 200 | 10/1 | 100 | 1 | 73 | 30,240 | No imide; very small amount of amide |
| 135/A | TMA | 400 | 5/1 | 100 | 1 | 74 | Solid Product | No imide; very small amount of amide |

*In each case, the reactant isocyanate used was NCO-10. With adducts 129/A, 129/B, and 132/A, 1500 grams of NCO-10 were added; and, with 134/A and 135/A, 2000 grams of NCO-10 were added. With 129/A, 129/B, and 132/A, 2250 grams of diluent isocyanate NCO-20 were added. No diluent isocyanate was used with adducts 134/A and 135/A.
**The product consisted of solid and liquid portions; the viscosity of the liquid portion was determined.

I claim:

1. In combination with a thermally stable and flame resistant rigid foam composition comprising the reaction product of one equivalent based on hydroxyl of a polyol having an average hydroxyl functionality of at least three and a molecular weight below 2000 and from about 0.5 to about 12 equivalents based on isocyanate of a polyarylpolyisocyanate-containing component, the improvement which comprises the polyarylpolyisocyanate-containing component being the monomeric imide-containing polyarylpolyisocyanate derivative prepared by pre-reacting a mixture consisting essentially of a polyarylpolyisocyanate consisting of 2–10 benzene or methyl-, ethyl-, or propyl-substituted benzene rings linked by methylene groups, said benzene rings having one isocyanate functional group per ring, and a compound selected from the group consisting of phthalic anhydride, tetrachlorophthalic anhydride and tetrabromophthalic anhydride, in a weight ratio of said polyarylpolyisocyanate to said anhydride of about 2:1 to 10:1 and at a temperature between 210°C. and 300°C. until a liquid product of the desired viscosity is obtained, to thereby convert from about 25 to 75 percent of the original anhydride groups to imide groups and to thereby incorporate an imide into the rigid form composition.

2. The composition of claim 1 wherein the amount of imide incorporated varies from about 35 to 65 percent.

3. The composition of claim 1 wherein tetrabromophthalic anhydride is pre-reacted with a polyarylpolyisocyanate to form the polyarylpolyisocyanate-containing compound.

4. The composition of claim 1 in which the polyol comprises the reaction adduct of: (1) a polyol component and (2) an anhydride component selected from the group consisting of the anhydride of polyfunctional carboxylic acid and wherein from about 5 to about 40 weight percent of the adduct is comprised of the anhydride and 95 to 60 percent of the adduct is comprised of the polyol.

* * * * *

UNITED STATES PATENT OFFICE
CERTIFICATE OF CORRECTION

PATENT NO. : 3,933,700
DATED : January 20, 1976
INVENTOR(S) : John K. Allen

It is certified that error appears in the above-identified patent and that said Letters Patent are hereby corrected as shown below:

| Column | Line | |
|---|---|---|
| 2 | 37 | "while the" should be -- while in the --. |
| 7 | 53 | "550°F." should be -- 500°F. --. |

10, Table II (continued)

Under the heading "TMA", "-20" should be -- - --;
" " " "CFCl$_3$", "0" should be -- 20 --;
" " " "Additive", "80" should be -- 0 --;
" " " "PWR", "11" should be -- 80 --;
" " " "EXT", "C" should be -- 11 --; and
" " " "FHt", in the third line insert -- C --.

Signed and Sealed this sixth Day of April 1976

[SEAL]

Attest:

RUTH C. MASON
Attesting Officer

C. MARSHALL DANN
Commissioner of Patents and Trademarks